UNITED STATES PATENT OFFICE.

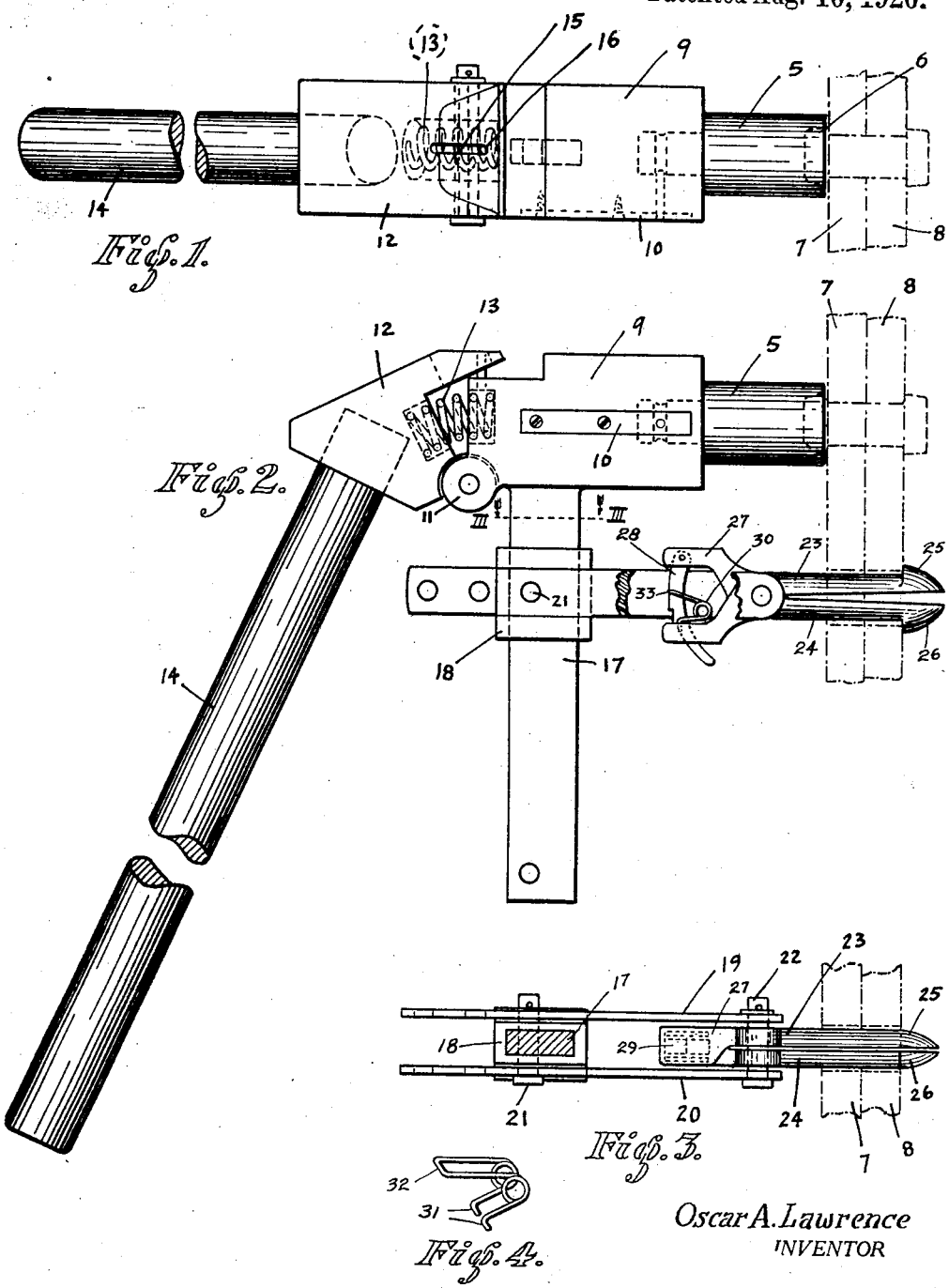

OSCAR A. LAWRENCE, OF SAN FRANCISCO, CALIFORNIA.

PRESSURE-BAR.

1,349,213.   Specification of Letters Patent.   Patented Aug. 10, 1920.

Application filed March 31, 1919. Serial No. 286,618.

*To all whom it may concern:*

Be it known that I, OSCAR A. LAWRENCE, a citizen of the United States, and a resident of the city and county of San Francisco, State of California, have made a new and useful Invention—to wit, Pressure-Bars; and I do hereby declare the following to be a full, clear, concise, and exact description of the same.

This invention relates to pressure bars adapted to be used in riveting operations, such as where it is necessary to hold one end of a rivet in a structural steel building, while the riveter's helper or "holder on" uses a pneumatic or other hammer for hitting the opposite end.

One of the objects of my invention is to produce a pressure bar which will relieve the operator from the terrific jar due to the vibration of the rivet being held in place. It is well known that riveters suffer from enlarged joints, growths and like afflictions brought about by this jar before referred to; consequently it is hard to secure labor that is willing to do this sort of work.

I have built several machines after this pattern, and find that very little vibration is transmitted to the arm or shoulder of the helper.

In this specification and the annexed drawings, the invention is illustrated in the form considered to be the best, but it is to be understood that the invention is not limited to such form, because it may be embodied in other forms and it is also to be understood that in and by the claims following the description it is desired to cover the invention in whatever form it may be embodied.

In the drawings:—

Figure 1 is a top plan view of my pressure bar.

Fig. 2 is a side elevation of the same.

Fig. 3 is a sectional view on the line III—III of Fig. 2 taken in the direction of the arrow, and Fig. 4 is a perspective view of a spring.

Referring to the drawings in detail, it will be noticed that I provide an anvil portion 5, which anvil portion may have a recess or die formed in the end thereof, the contour of which will act upon the rivet fashioning the same in accordance with the die, it being understood that when the rivet is within the die of the anvil it is in a hot and plastic condition capable of being formed under pressure.

The numerals 7 and 8 disclose in dotted lines two pieces of material capable of being joined together by means of rivets. The anvil 5 is attached to the head of a T-shaped member 9. This member should be relatively heavy. The anvil portion 5 is attached to this T-shaped member by means of a spring latch 10 resting in a groove shown in dotted lines in Fig. 1 on the stem of the anvil.

In the rear of the T-shaped member, I provide a hinge connection 11, to which I pivot the curved member 12. Between the member 9 and the member 12, I place an expansion spring 13, the ends of which I socket in said members 9 and 12. In the arc shaped member 12, I secure a handle 14 which handle may be of convenient length. In the arc shaped member 12, I form an opening 15 which receives a pin 16 attached to the member 9. The pin is free to move in the opening 15 and only limits the rotation of the member 12 upon the hinge connection 11.

Upon the depending part 17 of the T-shaped member 9, I place a slide 18 which slide is adapted to receive links 19 and 20, which links are held in position on said slide by a pin 21 passing through links, said slide and said depending member.

Carried by the forward end of the links 19 and 20 is a pin 22 and mounted upon this pin 22 are two gripper members 23 and 24. These gripper members are provided at their forward end with offset portions 25 and 26 adapted to come in contact with the side of the work upon which the riveter is operating.

These members 23 and 24 are formed at their rear end with offset portions, as best shown in Fig. 2. One of said offset portions 27 has an opening therein 28 (see Fig. 3). Within this opening is pivoted a link 29, the free end of which passes through a like opening in the member 23. This link is formed with ratchet teeth along one edge which ratchet teeth are adapted to act upon the member 23, thus holding the members 23 and 24 in open position, as shown in Fig. 3. This latch is controlled through the medium of a spring 30, which may be of any convenient form to accomplish the results desired. The form shown, however, is best illustrated in Fig. 4. The ends 31 are recessed in holes formed in the member 23 and the yoke 32 is retained in the notch 33 of this link. The device is operated as follows:—

A hot rivet is placed where desired, and the members 13 and 14 are pushed through the nearest rivet hole to the one being riveted. Adjustment is made upon the depending part of the member 9, so that said member 9 and the anvil carried thereon will be brought over the head of the rivet being operated upon. It is then only necessary to apply pressure to the lower part of the handle 14 until the riveting operation is complete. The terrific jar and consequent vibration will not be imparted to the helper, and at the same time the anvil will be held against the work much more rigidly.

When it is desired to remove this anvil, the latch 29 is pushed forward, which allows the members 23 and 24 to be closed and withdrawn from the rivet hole.

In practically all riveting operations, the rivets are placed in line with each other, and certain series will be equi-distant, consequently it is not necessary to adjust the device for each rivet operated upon, one adjustment serving for quite a large number.

Having thus described my invention, what I claim as new and desire to secure by Letters Patent of the United States is:—

1. In a device of the character described, the combination of an anvil base; an anvil removably secured in said base; gripping means, adapted to enter a rivet hole, parallel with said anvil base for holding the anvil in alinement with a rivet to be driven, and a spring pressed member attached to said anvil base for holding the same against a rivet to be driven.

2. In a device of the character described, the combination of an anvil base; an anvil removably secured in said base; clamping means, adapted to enter a rivet hole, and parallel with the anvil base for placing the anvil substantially in operative position and a spring pressed member attached to said anvil in operative position.

3. In a pressure bar, the combination of a T-shaped member having a handle hinged thereto; an anvil removably secured in said T-shaped member; gripping means slidably adjustable on said T-shaped member and parallel therewith for placing said anvil substantially in operative position; a spring interposed between said handle and T-shaped member whereby movement of said handle compresses said spring against said T-shaped member forcing same into operative position.

4. In a device of the character described, the combination of a T-shaped member having an anvil detachably mounted therein; gripping means slidably adjustable on the depending part of said T-shaped member and parallel with said anvil for placing the same substantially in operative position; a handle hinged to said T-shaped member at a point substantially opposite said anvil; an expansion spring interposed between said handle and said T-shaped member whereby movement of said handle compresses said spring against said anvil forcing same into operative position.

5. In a device of the character described, the combination of a T-shaped member, a detachable anvil carried thereby, a handle hinged to said T-shaped member at a point substantially opposite said anvil, an expansion spring retained between said handle and said T-shaped member, means for limiting the expansion of said spring, a slide carried by said T-shaped member, said slide being capable of adjustment, links slidably adjustable on said slide, said links carrying a pin at their forward end and gripper members pivoted upon said pin.

6. In a device of the character described, the combination of a T-shaped member, a detachable anvil carried thereby, a handle hinged to said T-shaped member at a point substantially opposite said anvil, an expansion spring retained between said handle and said T-shaped member, means for limiting the expansion of said spring, a slide carried by said T-shaped member, said slide being capable of adjustment, links slidably adjustable on said slide, said links carrying a pin at their forward end, gripper members pivoted upon said pin, and means for holding said gripper members in an expanded position.

7. In a device of the character described, the combination of a spring pressed anvil, a depending member, grippers carried by said depending member, hinged latch carried by one of said gripping members, and a spring adapted to control said latch.

8. In a device of the character described, the combination of a T-shaped member having an anvil detachably mounted therein; gripping means slidably adjustable on the depending part of said T-shaped member and parallel with said anvil for placing the same substantially in operative position; a handle hinged to said T-shaped member at a point substantially opposite said anvil; an expansion spring interposed between said handle and said T-shaped member whereby movement of said handle compresses said spring against said anvil forcing same into operative position and means for limiting the expansion of said spring.

9. In a device of the character described, the combination of a spring pressed anvil; a depending member thereon; a gripping means slidably adjustable on said depending member for holding said anvil in operative position; a latch for operating said gripping means and a spring for controlling said latch.

10. In a device of the character described, the combination of an anvil base having a depending member thereon; an anvil removably secured in said base; gripping means slidably adjustable on said depending member and parallel with said anvil for placing said anvil substantially in operative position and a spring pressed member hingedly connected to said anvil base for holding said anvil base in operative position.

In testimony whereof, I have hereunto set my hand at San Francisco, California, this 20th day of March, 1919.

OSCAR A. LAWRENCE.

In presence of—
A. J. HENRY.